(12) United States Patent
Engelberth

(10) Patent No.: US 6,295,399 B1
(45) Date of Patent: Sep. 25, 2001

(54) NON-LINEAR TEMPERATURE COMPENSATING DEVICE FOR FIBER GRATINGS AND A PACKAGE THEREFOR

(75) Inventor: Jon W. Engelberth, Denville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/657,848

(22) Filed: Sep. 8, 2000

Related U.S. Application Data

(63) Continuation-in-part of application No. 09/318,011, filed on May 25, 1999, now Pat. No. 6,144,789.

(51) Int. Cl.[7] ....................................................... G02B 6/34
(52) U.S. Cl. .................................. 385/37; 385/24; 359/130
(58) Field of Search ................................. 385/37, 13, 24

(56) References Cited

U.S. PATENT DOCUMENTS

| | | | |
|---|---|---|---|
| 5,757,540 | * | 5/1998 | Judkins et al. ........................... 385/37 |
| 5,841,920 | * | 11/1998 | Lemaire et al. ......................... 385/37 |
| 5,987,200 | * | 11/1998 | Fleming et al. ......................... 385/37 |
| 5,999,671 | * | 12/1999 | Jin et al. ................................. 385/37 |

* cited by examiner

Primary Examiner—Frank G. Font
Assistant Examiner—Michael P. Mooney
(74) Attorney, Agent, or Firm—David L. Davis

(57) ABSTRACT

A non-linear temperature compensating device for optical fiber gratings includes first and second expansion members having different coefficients of thermal expansion. The expansion members are elongated in a direction parallel to the fiber grating and levers are secured to both ends of the expansion members. Each lever has a first end flexibly secured to a respective end of the first expansion member and a middle portion flexibly secured to a respective end of the second expansion member. The other end of each lever is secured to a respective end of the fiber grating through a respective quartz block. The dimensions of the expansion members and the quartz blocks, as well as the materials of the expansion members, are selected to achieve a non-linear temperature response which substantially compensates the non-linear temperature response of the fiber grating. The expansion members, the levers and the fiber grating all lie substantially in a single plane. There is also disclosed a package for holding four of the temperature compensating devices in two rows of two devices each, with their fiber gratings adjacent each other so that when viewed in a plane orthogonally to the longitudinal axes of the fiber gratings, the fiber gratings are each at a respective corner of a rectangle.

13 Claims, 3 Drawing Sheets

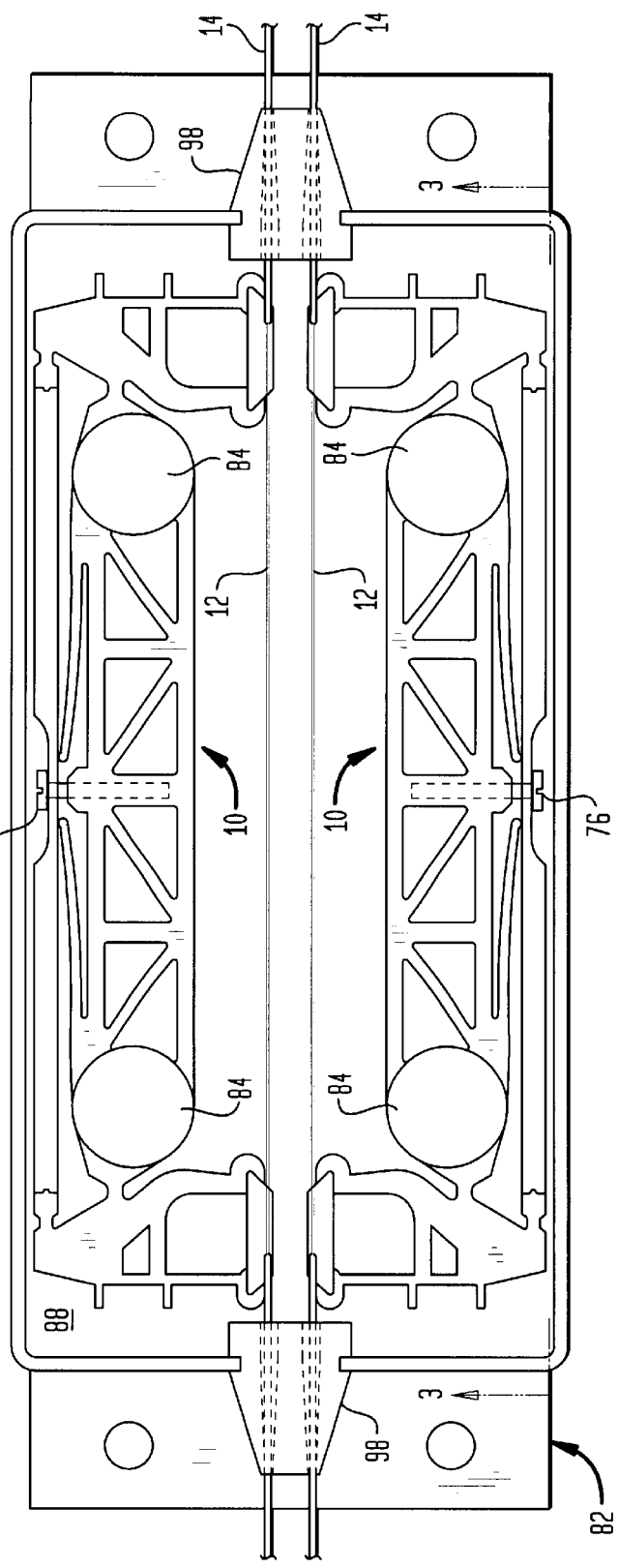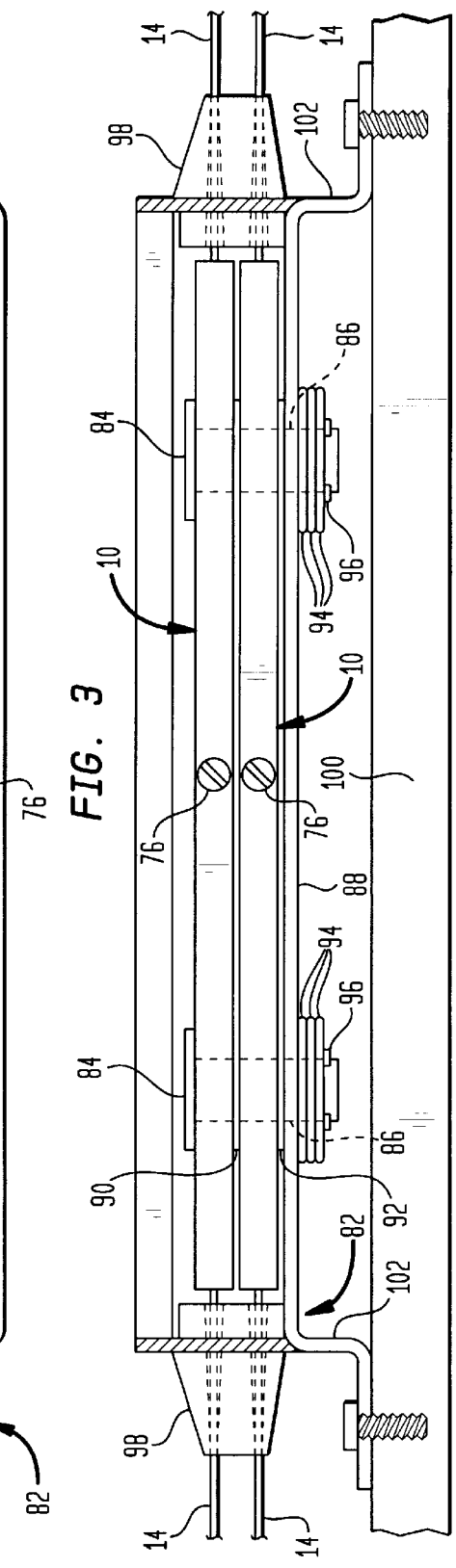

NON-LINEAR TEMPERATURE COMPENSATING DEVICE FOR FIBER GRATINGS AND A PACKAGE THEREFOR

This is a continuation-in-part of application Ser. No. 09/318,011, filed May 25, 1999 now U.S. Pat. No. 6,144, 789.

BACKGROUND OF THE INVENTION

This invention relates to optical fiber gratings used in optical communication systems and, more particularly, to an improved non-linear temperature compensating device for such optical fiber gratings.

Optical fiber gratings are formed by exposing a photosensitive fiber such as, for example, boron-doped germanosilicate fiber to ultraviolet light so as to create permanent refractive-index perturbations at selective sections along the core of the fiber. An optical fiber grating is a wavelength-selective reflector having a reflectance response curve with at least one well-defined peak. In other words, an optical fiber grating reflects light of a particular wavelength or a narrow band of wavelengths back along the original propagation direction, while permitting other wavelengths of light to propagate undisturbed. The reflected wavelength of light is often referred to as the grating wavelength.

Optical fiber gratings may be used in Wavelength Division Multiplexing optical systems for high-precision selective wavelength filtering so that signals propagating through an optical fiber can be separated, combined, and/or rerouted. They can also be used as feedback elements for a fiber optic laser or as external laser mirrors. For all such uses, it is essential that the grating wavelength remains constant over an expected temperature range of, for example, from −20° C. to 80° C. (i.e., $\Delta T=100°$ C.).

The grating wavelength $\gamma g$ (or Bragg wavelength) is related to the effective guided mode index, n, of the optical fiber and the spacing of the grating sections, $\Lambda$ (also known as the grating period), in the following way:

$$\gamma g = 2n\Lambda.$$

This equation shows that the effective guided mode index, n, and the grating period, $\Lambda$, are inversely proportional to each other. Therefore, in order to maintain $\gamma g$ constant, an increase, for example, in the effective guided mode index, n, requires a proportionate decrease in the grating period, $\Lambda$.

For optical communication systems, it is essential that the grating wavelength remains constant over the expected temperature range. But this requirement is not so easily satisfied since the effective guided mode index of a fiber varies rather significantly over an expected temperature range of, for example, from −20° C. to 80° C. (i.e., $\Delta T=100°$ C.), primarily due to the temperature dependence of the fiber's refractive index. It has been reported that over this temperature range, the grating wavelength shift of an uncompensated 1550 nm grating can exceed 1 nm, which can be detrimental to an optical communication system.

Fortunately, it can be readily shown that in order to hold $\gamma g$ constant over a temperature range, an increase in temperature must be accompanied by a corresponding decrease in strain in the fiber grating and vice versa. Stated in a different way, the change in strain ($\Delta\epsilon$) and change in temperature ($\Delta T$) in a fiber grating are inversely and linearly related to each other, that is:

$$\Delta\epsilon/\Delta T = \text{constant} < 0.$$

Accordingly, to compensate for, or counteract, an unwanted shift in grating wavelength, one could vary the grating period, $\Lambda$, through selective adjustment of strain in the fiber. Thus, for example, when the ambient temperature of the fiber grating rises, one may decrease the strain in the grating to maintain the same grating wavelength as was set at the initial temperature condition. Conversely, when the ambient temperature of the fiber grating decreases, the strain in the grating may be increased to maintain the grating wavelength constant.

U.S. patent application Ser. No. 09/023,425, filed Feb. 13, 1998, and assigned to the assignee of the present invention, discloses a compact temperature compensating device for optical fiber gratings which includes a pair of cylindrical expansion members which are coaxial with each other and with the fiber grating. A base member secures a distal end of the first and second expansion members to a distal end of the fiber grating, and a lever flexibly connects a proximal end of the first and second expansion members to a proximal end of the fiber grating. The coefficients of thermal expansion of the expansion members are different, so that a change in temperature causes the first and second expansion members to expand and contract differentially, thereby pivoting the lever to vary the axial strain in the fiber grating, maintaining the grating wavelength of the fiber grating substantially constant throughout a desired temperature range. While effective, it has been found that the disclosed device is not particularly easy to manufacture or install in modular packages. Further, once the prior device is manufactured, it is not easily adjusted. Accordingly, a need exists for a temperature compensating device for optical fiber gratings which is easy to manufacture, allows for multiple, modular devices to be stacked together in a common package, and is adjustable after manufacture.

Since the temperature versus wavelength response of the fiber grating displays a non-linearity, a need exists for such a temperature compensating device which compensates for such non-linearity.

SUMMARY OF THE INVENTION

According to the present invention, there is provided a non-linear temperature compensating device for a pre-strained fiber grating of an optical fiber. The temperature compensating device extends along a longitudinal axis of the fiber grating and is symmetrical about a line bisecting and orthogonal to the fiber grating. The temperature compensating device comprises first and second expansion members and first and second levers, wherein the expansion members, the levers and the fiber all lie substantially in a single plane. The first expansion member is formed of a material having a first coefficient of thermal expansion and extends parallel to the longitudinal axis of the fiber grating, with a length between first and second ends shorter than the fiber grating. The second expansion member is formed of a material having a second coefficient of thermal expansion and extends parallel to the longitudinal axis of the fiber grating, with a length between first and second ends at least as long as the fiber grating. The first and second coefficients of thermal expansion are different from each other. The first lever is formed unitarily with the second expansion member and has first and second ends and an intermediate portion and is flexibly connected to a first end of the second expansion member proximate the intermediate portion of the first lever. The second lever is formed unitarily with the second expansion member and has first and second ends and an intermediate portion, and is flexibly connected to a second end of the second expansion member proximate the intermediate portion of the second lever. Each of the levers is bifurcated at its first end into a pair of prongs, with each of the prongs being formed with a channel at its distal end facing the channel of the other prong. A first of the pair of prongs of each of the levers is positioned outwardly of the fiber grating and the second of the pair of prongs of each of the levers extends substantially parallel to the longitudinal axis of the fiber toward the other of the levers to leave a gap between the distal ends of the pair of second prongs which is centered at the line bisecting and orthogonal to the fiber grating. A first connecting arm is formed unitarily with the first lever and is flexibly joined at a first end to the second end of the first lever and is rigidly connected at its second end to the first end of the first expansion member. A second connecting arm is formed unitarily with the second lever and is flexibly joined at a first end to the second end of the second lever and is rigidly connected at its second end to the second end of the second expansion member. A pair of quartz blocks are each elongated along the longitudinal axis of the fiber and are each secured to a respective end of the fiber grating. Each quartz block is disposed in a pair of the channels in a respective lever prong pair. Accordingly, a change in temperature of the device causes the first and second expansion members to expand and contract differentially, thereby pivoting the first and second levers, and along with the expansion and contraction of the pair of quartz blocks, varying the axial strain in the fiber grating in a non-linear manner so as to maintain a grating wavelength of the fiber grating substantially constant throughout a desired temperature range.

In accordance with an aspect of this invention, the first and second expansion members are spaced from each other and the temperature compensating device further comprises an adjustment member extending between the midpoints of the first and second expansion members. The adjustment member is adapted to selectively vary the spacing between the first and second expansion members at their midpoints.

In accordance with a further aspect of this invention, the temperature compensating device further comprises a spring element interposed between the first and second expansion members. The spring element is adapted to provide a yieldable force to bias the first expansion member away from the second expansion member.

In accordance with yet another aspect of this invention, the second expansion member comprises first and second spaced elements extending parallel to the longitudinal axis of the fiber grating and a plurality of struts joining the first and second elements.

In accordance with still another aspect of this invention the gap between the distal ends of the pair of second prongs is less than about five percent (5%) of the length of the fiber grating.

In accordance with still a further aspect of this invention, the first expansion member is formed of stainless steel and the second expansion member is formed of Kovar.

In accordance with another aspect of this invention, the length of the first expansion member is about forty percent (40%) of the length of the fiber grating.

In accordance with yet a further aspect of this invention, a package for holding a plurality of the inventive temperature compensating devices is provided. The package includes a support formed of a material having the second coefficient of thermal expansion. The second expansion members of the plurality of temperature compensating devices are clamped to the support and are separated by spacers having the second coefficient of thermal expansion so that they do not interact.

BRIEF DESCRIPTION OF THE DRAWINGS

The foregoing will be more readily apparent upon reading the following description in conjunction with the drawings in which like elements in different FIGS. thereof are identified by the same reference numeral and wherein:

FIG. 2 is a plan view showing the mounting of four temperature compensating devices of the type shown in FIG. 1 into a modular package;

FIG. 3 is an elevational view taken along the line 3—3 in FIG. 2; and

DETAILED DESCRIPTION

Figure 1:
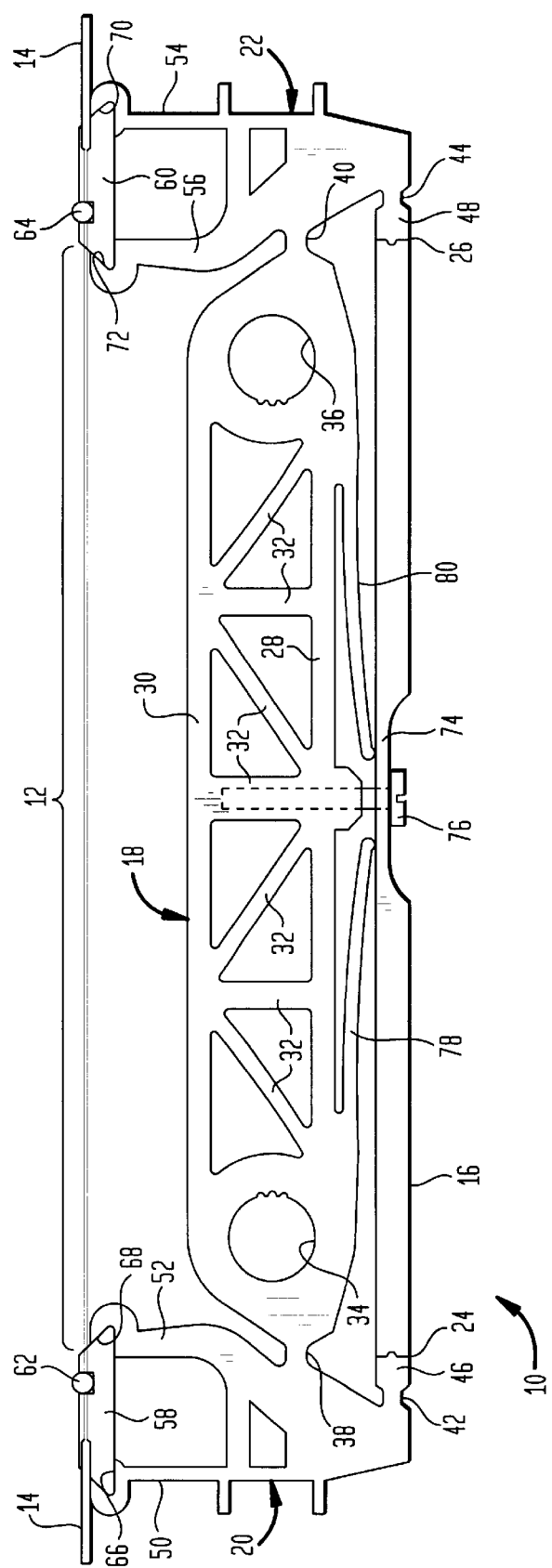
FIG. 1 is a side view of a first embodiment of a temperature compensating device according to the present invention.

FIG. 1 illustrates a first embodiment of a temperature compensating device, designated generally by the reference numeral 10, which holds an optical fiber grating 12 which is an integral portion of an optical fiber 14. The temperature compensating device 10 is substantially coplanar with the fiber 14 and includes a first expansion member 16, a second expansion member 18, a first lever 20, and a second lever 22. As shown, the first expansion member 16 is a separate piece from the unitary structure including the second expansion member 18, the first lever 20 and the second lever 22, and is secured to the lower ends of the levers 20, 22 by welding at the joints 24, 26, respectively. The first expansion member 16 is formed of a material having a high coefficient of thermal expansion, illustratively stainless steel. The second expansion member 18 and the levers 20, 22. are formed of a material having a low coefficient of thermal expansion, illustratively Kovar.

The first expansion member 16 is a bar which extends parallel to the longitudinal axis of the grating 12 and, illustratively, is at least as long as the fiber grating 12. The length of the bar 16 is chosen for convenience of welding and can be shorter than the fiber grating 12 if the location of the flexures 38, 40 (to be discussed hereinafter) is lowered. The second expansion member 18 is also at least as long as the grating 12, but is preferably formed as a first element 28 spaced from the first expansion member 16 and extending parallel to the longitudinal axis of the fiber grating 12, a second element 30 extending parallel to the longitudinal axis of the grating 12 and spaced from the first element 28, and a plurality of struts 32 joining the elements 28, 30. This construction of the second expansion member 18 provides a rigid structure which insures that stresses induced by changes in temperature translate in the direction parallel to the fiber grating 12, and not orthogonal thereto. The second expansion member 18 is further formed at each of its two ends with a respective through-hole 34, 36 extending orthogonally to the plane of the temperature compensating device 10. These holes 34, 36 are used for mounting the temperature compensating device 10 to a package, as will be described hereinafter.

The levers 20, 22 are formed unitarily with the second expansion member 18 and are joined at intermediate portions thereof to opposite ends of the expansion member 18 by flexures 38, 40, respectively. The lower ends of the levers 20, 22 are joined by flexures 42, 44, respectively, to welding portions 46, 48. The welding portions 46, 48 are welded to opposite ends of the first expansion member 16 at the joints 24, 26, respectively.

At their upper ends, each of the levers 20, 22 is bifurcated so as to have a pair of prongs 50, 52; 54, 56, respectively. The prongs 50, 52; 54, 56 are used for attaching the fiber grating 12 to the temperature compensating device 10 through the quartz blocks 58, 60. It has been shown that superior stability can be achieved by attaching the fiber grating 12 to the temperature compensating device 10 using a glass frit material. This glass frit attaches most readily to quartz. Accordingly, quartz blocks 58, 60 are provided and the ends of the fiber grating 12 are attached to the blocks 58, 60 by glass frit 62, 64, respectively. To hold the blocks 58, 60, each of the prongs 50, 52, 54, 56 is formed with a respective channel 66, 68, 70, 72 at its distal end, with the channels 66, 68 facing each other and the channels 70, 72 facing each other. The prongs with their channels are used to clamp the quartz blocks 58, 60 to the temperature compensating device 10, since it is known that attaching the blocks to the temperature compensating device by epoxy undesirably results in unwanted wavelength shifts. Preferably, the inner clamping surfaces of the channels 66, 68, 70, 72 are gold plated to provide compliance at rough spots to avoid damaging the quartz. Each of the quartz blocks 58, 60 is substantially trapezoidal in shape and the channels 66, 68, 70, 72 are formed so that there are four line contacts, two on angled surfaces, for each quartz block to provide full constraint against motion of the quartz block. Before installing the quartz blocks 58, 60, the prongs 50, 54 are slightly bent toward the prongs 52, 56, respectively. Then, the prongs 50, 54 are pulled away from the prongs 52, 56, respectively, to provide room for the blocks 58, 60 to be inserted into the channels pairs 66, 68; 70, 72. The prongs 50, 54 are then released and they spring back to firmly hold the quartz blocks 58, 60.

The aforedescribed construction possesses a number of advantages. Initially, it is noted that the temperature compensating device 10 is generally planar, which allows for easier manufacturing and also allows for multiple, modular temperature compensating devices to be stacked together in a common package, as will be described. The disclosed construction is also double-ended. This is advantageous since, by allowing both ends to rotate, twice as much compensating motion can be transmitted to the fiber grating 12 as from an identical single-ended design. Since the temperature compensating coefficient of the temperature compensating device 10 is very sensitive to the distance between the middle and lower flexures 38, 42; 40, 44, making all the flexures unitarily with the second expansion member 18 and the levers 20, 22 provides for a precise control of this distance. In contrast, if the lower flexures 42, 44 were part of the first expansion member 16, the relative locations of the flexures 42, 44 are limited by the accuracy of the welding process, which is approximately a twenty five fold degradation over the accuracy of the process for machining the flexures from the unitary construction of the second expansion member 18 and the levers 20, 22.

According to the present invention, the first expansion member 16 has a flexure 74 at its midpoint, and an adjusting screw 76 attaches this midpoint of the first expansion member 16 to the midpoint of the second expansion member 18. Because of the left/right symmetry of the temperature compensating device 10, there is no relative horizontal motion between the first and second expansion members 16, 18 at their midpoints. The use of the adjustment screw 76 to join the expansion members 16, 18 has two -purposes. Firstly, attachment of the relatively thin first expansion member 16 to the more robust second expansion member 18 limits deformation of the first expansion member 16 during shock, and increases its natural frequency during vibration. Secondly, the screw 76 can intentionally and controllably deflect the first expansion member 16 toward the second expansion member 18, increasing the tension on the fiber grating 12, thereby producing a tuning capability. Because of the high mechanical advantage of the tuning mechanism (typically at least 50:1 relative to screw motion), precise plus permanent stable tuning is possible, assuming that the screw 76 is locked into position after tuning is complete. Alternatively, the fiber grating 12 can be tuned during operation by permanently attaching a suitable actuator (e.g., DC servomotor) to the screw 76. Motion of the first expansion member 16 toward the second expansion member 18 is opposed by the spring members 78, 80, which are formed unitarily with the second expansion member 18. The spring members 78, 80 preload the first expansion member 16 against the head of the screw 76, preventing motion toward the second expansion member 18 under shock conditions.

FIGS. 2 and 3 show a modular package holding four temperature compensating devices 10 of the type shown in FIG. 1. The temperature compensating devices 10 are arranged in two rows, with each row having two devices arranged with their fiber gratings 12 adjacent to each other. The package includes a support 82 formed of a material having the same coefficient of thermal expansion as the second expansion member 18. Illustratively, this support 82 is made of Kovar. To hold the devices 10 to the support 82, four clamping members 84 are provided, each having the same coefficient of thermal expansion as the support 82 and the second expansion member 18. The clamping members 84 extend through the holes 34, 36 of the devices 10 and through appropriately positioned openings 86 in a planar portion 88 of the support 82. Between each stacked pair of devices 10, there is provided a spacer element 90 and between each of the lower devices 10 and the planar portion 88 is a spacer element 92. The spacer elements 90, 92 are likewise formed of a material having the same coefficient of thermal expansion as the support 82 and the second expansion member 18. The clamping members 84 are held in place by washers 94 and C-rings 96. The support 82 is formed of sheet stock material and is cut and bent so as to have walls surrounding the temperature compensating devices 10. Although not shown in the drawings, a lid can be welded to the walls after assembly of the modular package. The pigtail optical fibers 14 pass through oversized openings in bend limiting devices 98 disposed in opposed end walls of the support 82. This allows the fibers 14 to slide in and out of the package as the temperature compensating devices 10 vary the lengths of the gratings 12 during temperature changes. The bend limiting devices 98 hold the fibers 14 so that when viewed in a plane orthogonal to the longitudinal axis of the gratings 12, the gratings 12 are each at a respective corner of a rectangle. The aforedescribed package is attached to a substrate 100 by standoff legs 102 formed as part of the support 82. These legs 102 provide compliance so that thermally induced motion in the substrate 100 is isolated from the temperature compensating devices 10, while being stiff enough to avoid resonance during vibration testing, and plastic deformation or substantial force/displacement magnification during shock testing.

The disclosed device can also be used in applications where it is desired to change the fiber grating wavelength as a function of temperature, either monotonically increasing or monotonically decreasing. For such an application, the lever action would be changed by a careful selection of the distance between the middle and lower flexures 38, 42; 40, 44 to tailor the strain-temperature relationship.

As previously described for the embodiment of the temperature compensating device shown in FIG. 1, the first expansion member is formed of stainless steel and the second expansion member is formed of Kovar. It has been found through experimentation that, due to the non-linear coefficient of thermal expansion (CTE) of the Kovar, the design shown in FIG. 1 overcompensates for the non-linearity of the fiber grating. Thus, if the temperature versus wavelength response of the fiber grating is non-linear in an upwardly concave manner, the temperature response using the device shown in FIG. 1 is non-linear in a downwardly concave manner. The design of the temperature compensating device shown in FIG. 4 results in a nearly optimal response for eliminating the non-linearity of the fiber grating.

Figure 4:
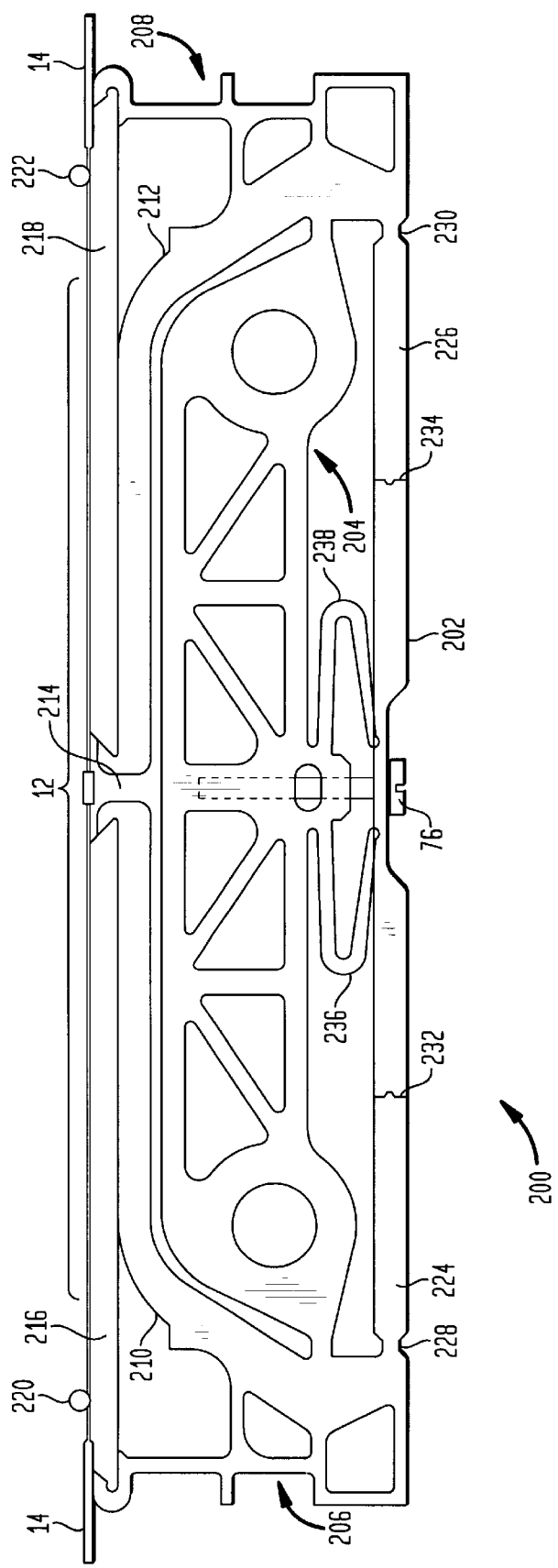
FIG. 4 is a side view of a second embodiment of a temperature compensating device according to the present invention.

As shown in FIG. 4, the temperature compensating device designated generally by the reference numeral 200 includes a first expansion member 202 formed of stainless steel (illustratively stainless steel 416) and a second expansion member 204 formed of Kovar. To reduce the overwhelming effect of the non-linearity of the Kovar, the length of the first expansion member 202 is reduced, preferably to about forty percent (40%) of the length of the fiber grating 12. The second expansion member 204 has its central section substantially identical to the central section of the second expansion member 18 of the embodiment shown in FIG. 1. The first and second levers 206, 208, respectively, are different from the levers 20, 22 (FIG. 1) in that each of the inner prongs 210, 212 extends substantially parallel to the longitudinal axis of the fiber 14 toward the other of the levers to leave a gap 214 between the distal ends of the prongs 210, 212. Since the temperature compensating device 200 has left/right symmetry about a line bisecting and orthogonal to the fiber grating 12, the gap 214 is centered at that line. Preferably, the gap 214 is less than about five percent (5%) of the length of the fiber grating 12. The elongated prongs 210, 212 allow elongated quartz blocks 216, 218 to be held in the channels at the ends of the prongs of the levers 206, 208. The ends of the fiber grating 12 are attached to the quartz blocks 216, 218 by glass frit 220, 222, respectively.

Since the first expansion member 202 has been shortened, first and second connecting arms 224, 226, respectively, are formed unitarily with the levers 206, 208 through flexures 228, 230. The other ends of the connecting arms 224, 226 are welded, at 232, 234, to the first expansion member 202.

Like the embodiment shown in FIG. 1, the embodiment shown in FIG. 4 includes an adjusting screw 76 to attach the midpoint of the first expansion member 202 to the midpoint of the second expansion member 204. The spring members 236, 238 preload the first expansion member 202 against the head of the screw 76. The spring members 236, 238 are folded back on themselves, rather than being of the shape shown in FIG. 1, to provide room for forming the welds 232, 234 completely around the first expansion member 202.

The remaining undescribed structure of the temperature compensating device 200 shown in FIG. 4 is substantially the same as that of the temperature compensating device 10 as shown in FIG. 1. The operation of the two devices are the same, the difference being that the dimensional changes results in the device 200 substantially eliminating the non-linear temperature response.

Accordingly, there has been disclosed an improved temperature compensating device for optical fiber gratings, along with a package therefor. While illustrative embodiments of the present invention have been disclosed herein, it is understood that various adaptations and modifications to the disclosed embodiments are possible and it is intended that this invention be limited only by the scope of the appended claims. Thus, for example, the disclosed and claimed temperature compensating devices are not limited to use with fiber Bragg gratings, but are usable with other types of fiber devices as well.

What is claimed is:

1. A non-linear temperature compensating device for a pre-strained fiber grating of an optical fiber, said temperature compensating device extending along a longitudinal axis of the fiber grating and being symmetrical about a line bisecting and orthogonal to the fiber grating, the device comprising:

a first expansion member formed of a material having a first coefficient of thermal expansion and extending parallel to the longitudinal axis of the fiber grating and having a length between first and second ends shorter than the fiber grating;

a second expansion member formed of a material having a second coefficient of thermal expansion and extending parallel to the longitudinal axis of the fiber grating and having a length between first and second ends at least as long as the fiber grating, said second coefficient of thermal expansion being different from said first coefficient of thermal expansion;

a first lever formed unitarily with said second expansion member and having first and second ends and an intermediate portion, said first lever being flexibly connected to a first end of said second expansion member proximate the intermediate portion of said first lever, said first lever being bifurcated at a first end into a pair of prongs, with each of said prongs being formed with a channel at its distal end facing the channel of the other prong;

a first connecting arm formed unitarily with said first lever and having first and second ends, said first connecting arm being flexibly joined at its first end to the second end of said first lever and being rigidly connected at its second end to the first end of said first expansion member;

a second lever formed unitarily with said second expansion member and having first and second ends and an intermediate portion, said second lever being flexibly connected to a second end of said second expansion member proximate the intermediate portion of said second lever, said second lever being bifurcated at a first end into a pair of prongs, with each of said prongs being formed with a channel at its distal end facing the channel of the other prong;

a second connecting arm formed unitarily with said second lever and having first and second ends, said second connecting arm being flexibly joined at its first end to the second end of said second lever and being rigidly connected at its second end to the second end of said second expansion member; and a pair of quartz blocks each elongated along the longitudinal axis of the fiber and secured to a respective end of said fiber grating and each disposed in a pair of said channels in a respective lever prong pair;

wherein a first of said pair of prongs of each of said levers is positioned outwardly of the fiber grating and the second of said pair of prongs of each of said levers extends substantially parallel to the longitudinal axis of the fiber toward the other of said levers to leave a gap between the distal ends of the pair of second prongs which is centered at the line bisecting and orthogonal to the fiber grating;

wherein said expansion members, said levers, said connecting arms, said quartz blocks and said fiber all lie substantially in a single plane;

whereby a change in temperature of said device causes said first and second expansion members to expand and contract differentially, thereby pivoting said first and second levers and, along with the expansion and contraction of said pair of quartz blocks, varying the axial strain in the fiber grating.

2. The temperature compensating device according to claim 1 wherein said first coefficient of thermal expansion is greater than said second coefficient of thermal expansion.

3. The temperature compensating device according to claim 1 wherein the intermediate portion of each of said first and second levers is secured to the respective end of said second expansion member through a flexure such that said first and second levers may pivot about said second expansion member as said first expansion member expands and contracts.

4. The temperature compensating device according to claim 1 wherein said first and second expansion members are spaced from each other and the temperature compensating device further comprises:

an adjustment member extending between the midpoints of said first and second expansion members and adapted to selectively vary the spacing between said first and second expansion members at their midpoints.

5. The temperature compensating device according to claim 4 further comprising:

a spring element interposed between said first and second expansion members and adapted to provide a yieldable force to bias said first expansion member away from said second expansion member.

6. The -temperature compensating device according to claim 5 wherein said spring element comprises a pair of leaf springs on opposite sides of said adjustment member and formed unitarily with said second expansion member.

7. The temperature compensating device according to claim 1 wherein said second expansion member comprises:

first and second spaced elements extending parallel to the longitudinal axis of the fiber grating; and a plurality of struts joining said first and second elements.

8. The temperature compensating device according to claim 1 wherein the gap between the distal ends of the pair of second prongs is less than about five percent (5%) of the length of the fiber grating.

9. The temperature compensating device according to claim 1 wherein the first expansion member is formed of stainless steel and the second expansion member is formed of Kovar.

10. The temperature compensating device according to claim 9 wherein the length of the first expansion member is about forty percent (40%) of the length of the fiber grating.

11. A package for holding a plurality of temperature compensating devices each of the type according to claim 1, the package comprising:

a support formed of a material having said second coefficient of thermal expansion;

a plurality of clamping members each of a material having said second coefficient of thermal expansion and adapted to engage said support and the second expansion members of said plurality of temperature compensating devices to hold said plurality of temperature compensating devices with their planes in a parallel array; and a plurality of spacer elements each of a material having said second coefficient of thermal expansion and each positioned at a respective location between adjacent temperature compensating devices or between said support and an adjacent temperature compensating device.

12. The package according to claim 11 wherein:

there are four temperature compensating devices;

the support member includes a generally planar portion having four openings;

each second expansion member is formed with a pair of spaced through-holes extending orthogonally to the plane of the respective temperature compensating device;

there are four clamping members; and the temperature compensating devices are arranged in two rows, each row has two temperature compensating devices arranged with their fiber gratings adjacent to each other, each clamping member extends through a respective support member opening and through respective through-holes of second expansion members in each of the rows, so that when viewed in a plane orthogonal to the longitudinal axes of the fiber gratings the fiber gratings are each at a respective corner of a rectangle.

13. The package according to claim 11 wherein said support is formed with standoff legs for mounting the package to a substrate.

* * * * *